Figure 1:
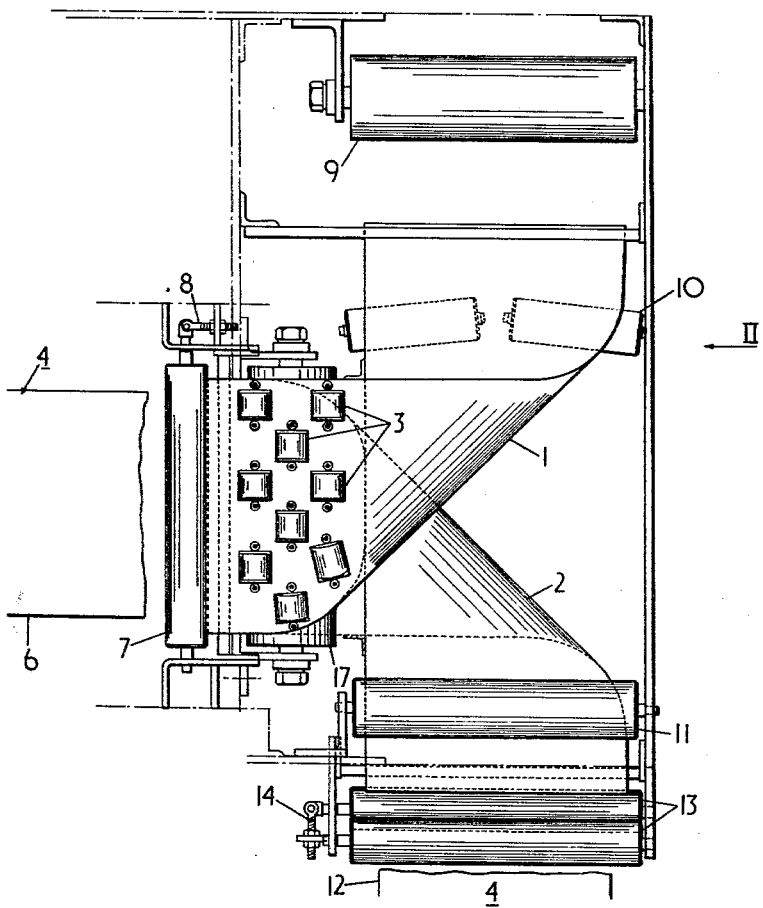

May 18, 1965  J. GIBBON  3,184,043
CONVEYOR SYSTEMS

Filed July 7, 1961  2 Sheets-Sheet 1

Inventor
John Gibbon

By Stevens Davis Miller & Mosher
Attorneys

May 18, 1965  J. GIBBON  3,184,043
CONVEYOR SYSTEMS

Filed July 7, 1961  2 Sheets-Sheet 2

Inventor
John Gibbon
By Stevens Davis Miller & Mosher
Attorneys

3,184,043
CONVEYOR SYSTEMS
John Gibbon, Chilton Moor, England, assignor to Coal Industry (Patents) Limited, London, England
Filed July 7, 1961, Ser. No. 123,387
1 Claim. (Cl. 198—187)

This invention relates to an angle station in an endless belt or the like conveyor system. By an "angle station" is to be understood a station in the system at which, during operating of the system, a run of the belt or the like is caused to change its direction of travel so that the direction of its width is also changed. Change of direction of travel in this manner will hereinafter be referred to as "said change of direction."

Angle stations have been proposed, for example, in British Patent No. 709,019, which consist of an assembly of idler rollers arranged to be upstanding from a flexible mesh which can be bent over to form a curved guide for the belt, thus turning the belt through any desired angle. Such angle stations have the following disadvantages: (i) their construction is difficult and costly, owing to the large number of short links, each of which must be machined, pivoted to each other and to the shafts on which the idler rollers rotate and also owing to the large number of tension springs and links which form the cross-ties of the mesh; (ii) their construction lacks robustness and is susceptible to damage, particularly from pieces of material displaced from the belt, or from dust, because of the unprotected positioning of the idler rollers and their bearings.

These factors are particularly important when the angle station is to be used in conjunction with a conveyor system of a mining machine in an underground mine where space is limited and conditions of use are extremely arduous, and it is accordingly an object of the invention to provide a simple, compact, and robust angle station of a design which requires little maintenance.

The invention consists of an angle station for an endless belt conveying system comprising a curved plate having apertures through which project rollers on which the belt runs during operation of the system, and a reversing roller around which the belt passes after leaving the curved plate, the plate and the reversing roller being so arranged that material carried by the run of the belt falls from that portion of the run passing over the projecting rollers at any given instant onto a portion of the run which has passed around the reversing roller.

In one form of the invention the angle station is constructed to effect said change of direction of both runs of the belt or the like and this is achieved by including in the station two curved plates each having mounted thereon a plurality of rollers, the plates and rollers being so arranged that in operation of the system one run passes over the rollers associated with one of the plates to effect said change of direction in said one run and the other run passes over the rollers associated with the other of the plates to effect said change of direction of said other run. Advantageously, the two plates are so arranged that the two runs lie one above the other on both sides of the station.

The present specification also describes a method of making the curved plate for use in the above defined angle station which includes the steps of marking the positions required for the rollers on a flat plate and subsequently bending the flat plate to the required curvature.

Figure 2:
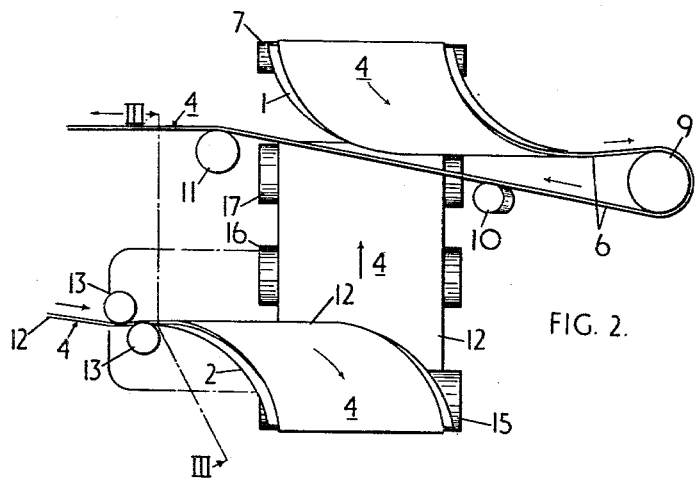
Figure 3:
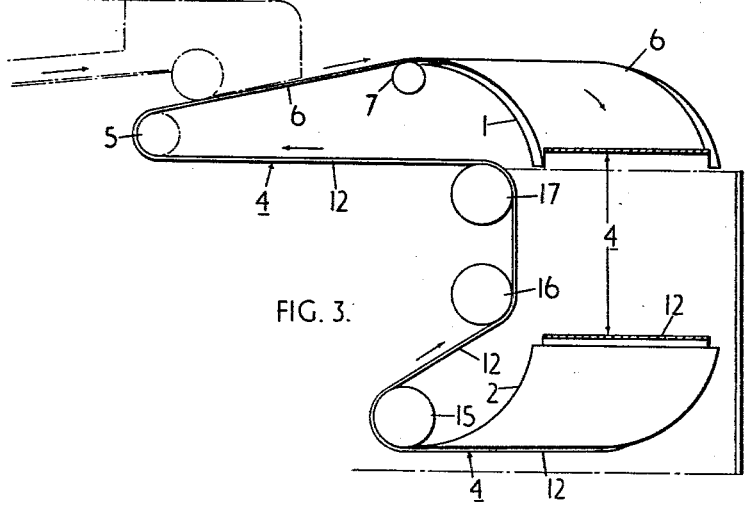
Figure 4:
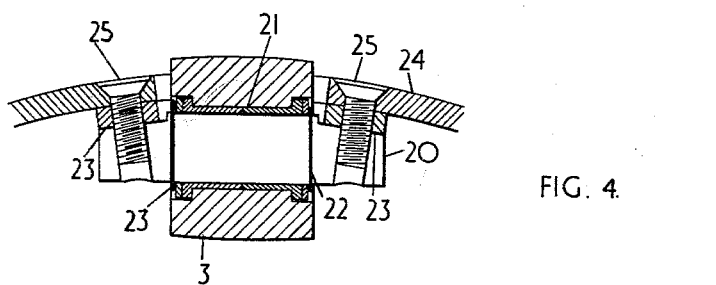

One embodiment of the present invention will now be described in greater detail, by way of example only, with reference to the accompanying drawings:

FIGURE 1 being a plan view of an angle station according to the invention, with the belt removed for the sake of clarity, FIGURE 2, a view in the direction of arrow II in FIGURE 1, with an end plate removed, FIGURE 3, a cross-section on the line III—III of FIGURE 2, and FIGURE 4, a fragmental view showing one manner of mounting the rollers in the curved plates.

As shown in the said drawings, the angle station comprises two similar curved plates 1 and 2 which are arranged one above the other and which are provided each with a plurality of rollers 3 projecting through apertures in the plate (for the sake of clarity, only some of the rollers are shown on plate 1 only). Over the rollers 3 passes a conveyor belt 4.

At one end of a conveyor system (not shown in full) is a tail roller 5 from which the upper run 6 of the belt 4 passes to a leading roller 7 immediately ahead of the upper curved plate 1. The roller 7 is adjustable angularly with respect to the direction of travel of the belt 4 over the roller 7 by means of the screw-threaded member 8 (FIGURE 1) to bias the belt 4 as it enters the angle station. From the roller 7 the upper run 6 passes over the rollers 3 on the upper curved plate 1 and around a reversing roller 9 by which the direction of travel of the run 6 is reversed behind the curved plate 1. From the roller 9 the run 6 passes over a pair of centralising rollers 10 which in addition to being axially inclined with respect to each other are also disposed so that the belt is slightly troughed so as to effect centralisation of the run 6 with respect to the rollers 10. The run 6 then passes from the rollers 10 to a final roller 11 before leaving the station.

It will be noted that the plate 1 and the various rollers are so arranged that material carried by the run 6 is transferred from the run as it passes over the rollers 3 mounted on the curved plate on to the portion of the run 6 between the pair of rollers 10 and the roller 11. By this arrangement the material is carried by the same run 6 both before and after it leaves the angle station. Spill plates (not shown) may be fitted to assist in the satisfactory transfer of the material.

From the angle station, the run 6 passes to the discharge end (not shown) of the system in the normal manner and the belt 4 returns as the lower run 12.

As the lower run 12 of the conveyor belt 4 enters the angle station it passes between a pair of guide rollers 13 one of which is angularly adjustable by means of a screw-threaded member 14 to bias the belt as it enters the angle station. The rollers 13 are positioned immediately ahead of the lower curved plate 2, and after the run 12 has passed between the rollers 13 and over the rollers (not shown) mounted on plate 2, it passes to a single reversing roller 15 (FIGURES 2 and 3) by which the direction of travel of the run 12 is substantially reversed. Behind the roller 15 is a pair of reversing rollers 16 and 17 mounted vertically one above the other as to effect substantially a 180° change in direction of travel of the run. From the upper reversing roller 17 the run 12 then leaves the angle station and passes to the tail roller 5.

Alternatively, the lower run of the conveyor belt (which will normally be the run which returns unladen) may enter the angle station and pass beneath, around, and over a curved plate, and then leave the angle station and pass to a tail roller as in the previously described embodiment. This latter construction has the advantage that rollers 15, 16, and 17 are dispensed with.

It will be seen that by the above described embodiment a particularly compact and satisfactory device is provided by which each run of the belt is caused to change its direction of travel by 90° so that the direction of its width is also changed by 90°.

One manner of mounting the rollers on the curved plates is shown in FIGURE 4, from which it can be seen that the roller 3 is carried by a shaft 20 and on which it is rotatably mounted by means of bearing bushes 21. The roller 3 is located axially on the shaft 20 by a pair of circlips 22. The ends of the shaft 20 are cut away at 23 to fit against pads welded to the plate 24 (which may be either plate 1 or plate 2 of FIGURES 1–3) and the shaft 20 is secured to the plate 24 by a pair of screws 25.

It is well known that the majority of a number of rollers placed to turn a belt through an angle must have their axes normal to the direction of travel of the belt, otherwise the belt will tend to wander off line. To correct this tendency, the two outermost longitudinal rows of rollers on each side of the plate may be arranged with their axes of rotation inclined somewhat forwardly, i.e., so that the axes make an angle of less than 90°, conveniently about 85°, to the direction of travel of the belt. It may be possible to achieve adequate centralisation of the belt with only the outermost row of rollers on each side having their axes at this angle, or, if the nature of the belt and conditions of use are such that the belt tends to run off centre readily, it may be necessary for the three outermost rows of rollers on each side to be positioned in this way. To ensure correct placing of the rollers 3 in the above-described angle station the required positions of the rollers 3 are marked off for drilling and slot cutting whilst the plates 1 and 2 are flat, and the plates are then subsequently bent to the required curvatures.

The roller positions are so marked off on each plate when flat that if the rollers were mounted on the plate after bending, their axes of rotation would be parallel to lines perpendicular to the long edges of the plate. The holes and slots for the rollers may be drilled and cut after the plate has been bent.

Although the above embodiment has been described with reference to an endless belt conveyor, it will be appreciated that the invention is applicable to other forms of conveyor systems incorporating endless flexible conveying members.

It will be noted that in the above-described embodiment the belt is turned over in every complete run through the apparatus and, therefore, the two sides of the belt are subject to approximately equal amounts of wear and the useful life of the belt is not shortened by excessive wear on one side only.

In a test run, an angle station according to the invention ran for 62 hours consecutively at the high loading of 350 tons per hour.

An angle station according to the invention may, for example, be used in conjunction with a mining machine such as that described in British patent specification No. 800,864 so that an endless conveyor belt can take a right-angled or other turn at the junction of a stall and a roadway in an underground mine.

I claim:

An angle station for an endless belt conveyor system comprising a framework, a first curved plate mounted in the said framework and curved in part-spiral shape about a first axis at an angle to one of its sides in such a manner that the said one of its sides and a side parallel to it before curvature are after curvature at approximately 90° to one another and are in parallel and vertically spaced planes, a second curved plate mounted in said framework below said first curved plate and curved in part-spiral shape about a second axis at essentially 90° to said first axis in such a manner that one of its sides and a side parallel to it before curvature are after curvature at approximately 90° to one another and are in parallel and vertically spaced planes, each said plates being apertured so as to define a plurality of openings arranged in spaced rows extending parallel to the said first mentioned side of the plate, the openings in one row being laterally off-set from the openings in an immediately adjacent row and each opening having projecting therethrough a roller mounted on the said plate, the spacing of said openings and the extent of projection of said rollers being such that in operation of the angle station, a conveyor belt passing around the plate is in contact only with the rollers, the angle station further comprising a reversing roller mounted adjacent to and with its axis substantially parallel to one of the sides of the first curved plate, whereby in operation the conveyor belt passes over and around the first curved plate then around the reversing roller so that material carried on that portion of the run of the belt which is passing over the first curved plate at any given instant falls onto that portion of the belt run which has passed around the reversing roller.

References Cited by the Examiner
UNITED STATES PATENTS

| | | | |
|---|---|---|---|
| 545,753 | 9/95 | Weldon et al. | 198—202 X |
| 2,222,019 | 11/40 | Buchanan | 198—187 X |
| 2,457,407 | 12/48 | Sebastian | 198—184 |
| 2,561,708 | 7/51 | Milik | 198—192 X |

FOREIGN PATENTS 528,450 6/31 Germany.

SAMUEL F. COLEMAN, *Primary Examiner.*
JULIUS E. WEST, ERNEST A. FALLER, JR., *Examiners.*